UNITED STATES PATENT OFFICE.

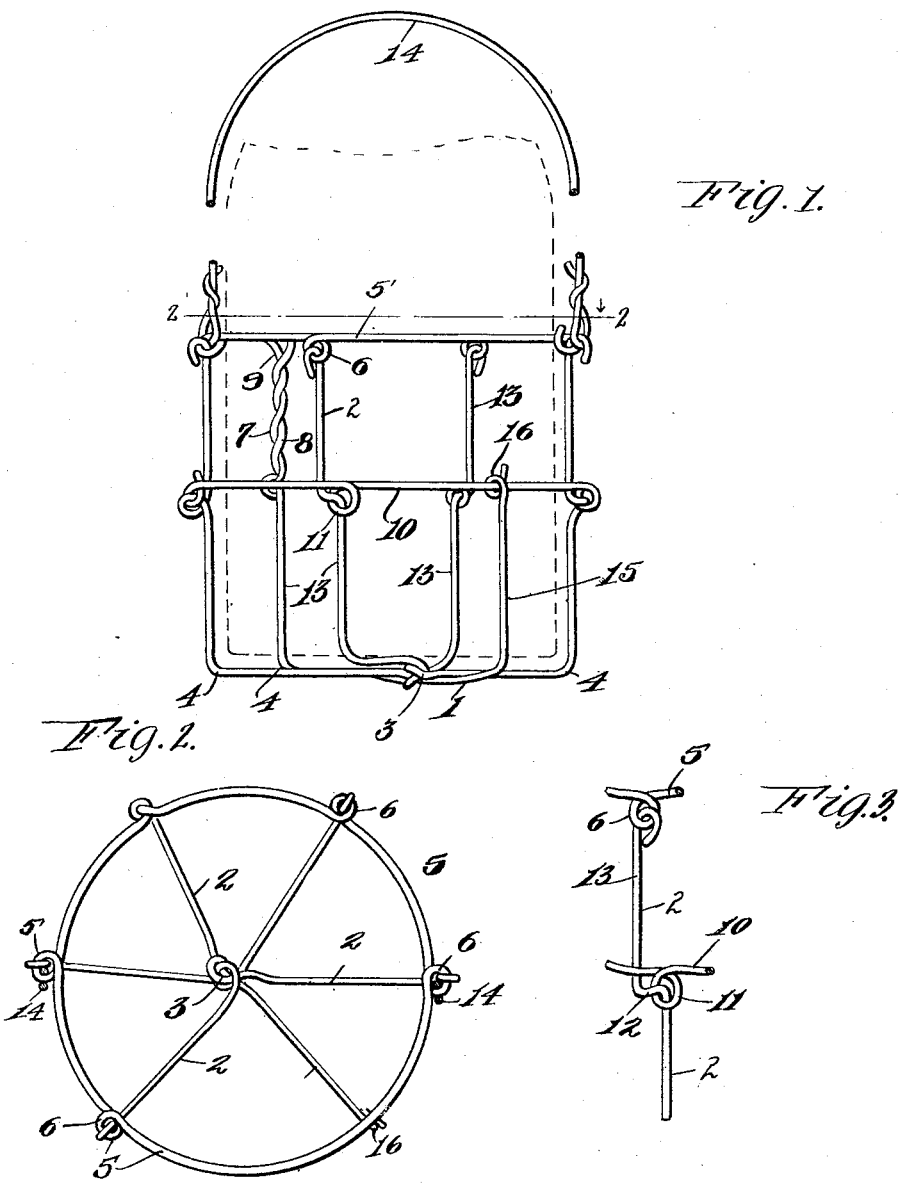

EDWIN C. SCHREIBER, OF CHICAGO HEIGHTS, ILLINOIS.

RECEPTACLE FOR CARRYING MILK-BOTTLES.

1,113,252. Specification of Letters Patent. Patented Oct. 13, 1914.

Application filed January 2, 1913. Serial No. 739,824.

*To all whom it may concern:*

Be it known that I, EDWIN C. SCHREIBER, a citizen of the United States, residing at Chicago Heights, in the county of Cook and State of Illinois, have invented new and useful Improvements in Receptacles for Carrying Milk-Bottles, of which the following is a specification.

This invention relates to receptacles and more particularly to a receptacle adapted for receiving milk bottles or the like when it is desired to carry the same from one place to another.

The primary object of this invention is the provision of a receptacle having a handle for carrying milk bottles or the like from one place to another. It is a well known fact that the ordinary milk bottle is very inconveniently shaped for carrying and that quite often the bottle slips from one's grasp, falling upon the pavement or the floor and breaking thus spilling the milk.

It is an object of this invention to provide a neat, convenient and stable means for carrying a milk bottle or the like whereby the danger of dropping the same is greatly decreased.

Another object of this invention is to provide a device of this nature which is constructed of wire bent and twisted together so as to form a durable as well as cheap carrier and one wherein no soldering or other means of securing the wires together is used.

With the foregoing and other objects in view, this invention consists essentially in the provision of a number of wires bent and joined together by bending so as to form a receptacle shaped so as to conform to the shape of the lower part of the milk bottle or the like and a wire connected to the body portion of the device which forms a handle therefor.

In describing the invention in detail, reference will be had to the accompanying drawings wherein like characters designate like or corresponding parts throughout the several views, and in which:—

Figure 1 is a side elevation of the device showing a part of the handle broken away. Fig. 2 is a sectional view on the line 2—2 of Fig. 1, and Fig. 3 is a detail view.

In referring to the drawings by numeral, 1 designates the base of the receptacle which is made up of a plurality of wires 2. The wires 2 are bent and coiled about each other as is shown at 3 in order to strengthen and make the base more substantial and are bent upward at 4. A wire 5 provided with a plurality of loops 6 forms a top for the receptacle and one end of each of the wires 3 is inserted through the loops 6 and bent upon themselves to securely hold the wires 3 and the wires 5 together. The ends 7 and 8 of the wire 5 are twisted together and bent downwardly as is shown at 9. The end 7 being much longer than the end 8 is bent so as to form an annular reinforcing member 10. The member 10 is provided with loops 11 through which the wires 3 pass. In passing through the loops 11, portions 12 of the wires 2 are bent at right angles to the parts 13 and parallel with the wires of the base. This bending forms a secure fastening means and prevents the wires from buckling.

A handle 14 formed of a single piece of wire is secured to two of the loops 6 in the wire 5 and forms a convenient means for carrying the receptacle. A wire 15 terminates at the junction between it and the reinforcing member 10 and is looped thereabout as is shown at 16, forming a side wire for the receptacle so as to more completely provide against displacement of the bottle.

In practical fields certain minor features of construction may necessitate alterations to which the patentee is entitled provided such alterations are comprehended within the scope of what is claimed.

What is claimed as new and novel is:—

In a carrying receptacle, a base formed of a plurality of wires coiled upon each other at the center of the base and having their ends bent upwardly and forming sides for the receptacle, a wire having a plurality of loops formed therein forming a top for said receptacle and having one end bent downwardly and outwardly encompassing the side wires of the receptacle to form a brace therefor, said side wires inserted through said loops and bent upon themselves for connection to said top, and a bail wire connected to said top wire.

EDWIN C. SCHREIBER.

Witnesses:
S. E. SCHMIDT,
CHAS. R. CRAIN.

---

Copies of this patent may be obtained for five cents each, by addressing the "Commissioner of Patents, Washington, D. C."